(12) United States Patent
Bagaria et al.

(10) Patent No.: US 8,879,848 B2
(45) Date of Patent: Nov. 4, 2014

(54) MACHINE VISION BASED AUTOMATIC MAXIMAL CLAMP MEASUREMENT TOOL

(75) Inventors: Venkatesh Bagaria, Bangalore (IN); Nicolas Vazquez, Austin, TX (US); Dinesh R. Nair, Austin, TX (US)

(73) Assignee: National Instruments Corporation, Austin, TX (US)

(*) Notice: Subject to any disclaimer, the term of this patent is extended or adjusted under 35 U.S.C. 154(b) by 306 days.

(21) Appl. No.: 13/559,767

(22) Filed: Jul. 27, 2012

(65) Prior Publication Data

US 2013/0031498 A1 Jan. 31, 2013

Related U.S. Application Data

(60) Provisional application No. 61/512,212, filed on Jul. 27, 2011.

(51) Int. Cl.
| | |
|---|---|
| *G06K 9/48* | (2006.01) |
| *G06T 7/60* | (2006.01) |
| *G06T 7/00* | (2006.01) |

(52) U.S. Cl.
CPC ............. *G06T 7/0006* (2013.01); *G06T 7/602* (2013.01); *G06T 7/0085* (2013.01); *G06T 2207/30164* (2013.01)
USPC ........... 382/199; 382/195; 382/232; 382/162; 382/103; 382/166

(58) Field of Classification Search
USPC ......... 382/103, 162, 166, 199, 195, 232, 143; 358/518, 520, 523
See application file for complete search history.

(56) References Cited

U.S. PATENT DOCUMENTS

| | | | |
|---|---|---|---|
| 6,507,675 B1 | 1/2003 | Lee et al. | |
| 6,571,006 B1 | 5/2003 | Montillo et al. | |
| 7,139,421 B1 | 11/2006 | Fix et al. | |
| 7,957,554 B1 | 6/2011 | Silver et al. | |
| 8,165,385 B2 | 4/2012 | Reeves et al. | |
| 2003/0193522 A1 | 10/2003 | Chandhoke | |
| 2005/0052556 A1 | 3/2005 | Henderson et al. | |
| 2009/0028461 A1* | 1/2009 | Wieringa et al. | 382/284 |
| 2010/0036268 A1* | 2/2010 | Ferren et al. | 600/504 |
| 2013/0188040 A1* | 7/2013 | Kamen et al. | 348/135 |

* cited by examiner

*Primary Examiner* — Ali Bayat
(74) *Attorney, Agent, or Firm* — Meyerstons Hood Kivlin Kowert & Goetzel, P.C.; Jeffrey C. Hood; Mark S. Williams

(57) ABSTRACT

System and method for measuring distances in an image. An image is received that includes curves corresponding to one or more objects in the image. Multiple curves in a specified region of interest (ROI) in the image are detected, where the ROI has a specified direction. Each curve includes respective curve points. A convex hull is determined based on the respective curve points. One or more candidate antipodal point pairs of the convex hull are determined. A first point pair of the one or more antipodal point pairs is selected based on one or more specified constraints. A clamp angle corresponding to the first point pair is determined. A distance between the first point pair along a direction specified by the clamp angle is determined. The first point pair, the distance, and the clamp angle are stored. Calibration information may be applied at any point during the process.

24 Claims, 12 Drawing Sheets

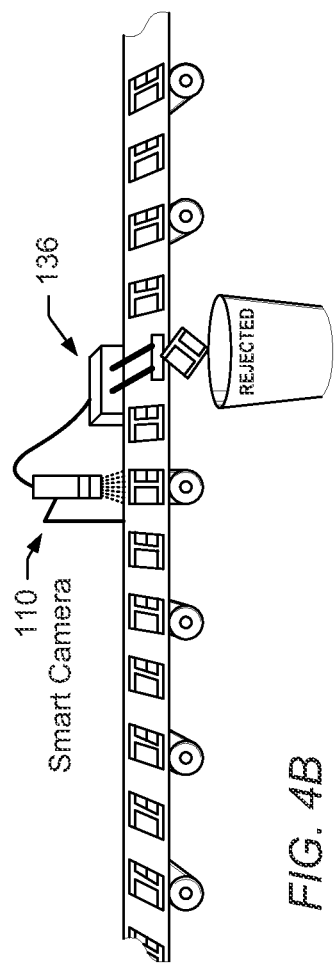

MACHINE VISION BASED AUTOMATIC MAXIMAL CLAMP MEASUREMENT TOOL

PRIORITY DATA

This application claims benefit of priority to U.S. Provisional Application Ser. No. 61/512,212, titled "Machine Vision Based Automatic Maximal Clamp Measurement Tool", filed Jul. 27, 2011, whose inventors are Venkatesh Bagaria, Nicolas Vazquez, and Dinesh R. Nair, which is hereby incorporated by reference in its entirety as though fully and completely set forth herein.

FIELD OF THE INVENTION

The present invention relates to the machine vision, and more particularly to a machine vision based automatic maximal clamp measurement tool.

DESCRIPTION OF THE RELATED ART

Machine vision is an increasingly important technology in many areas of endeavor, such as manufacturing, quality control, security, and research, among others. The problem of measuring distances accurately is a commonly encountered task in the field of machine vision. Existing tools typically aim to mimic the action of a physical caliper on an object by using vision techniques on a 2D image of the object. These solutions broadly fall into two categories: edge probe based "caliper" tools, and multiple edge probe based "clamp" tools.

Edge probe based caliper tools (for example, the VDM (Vision Development Module) Caliper tool, provided by National Instruments Corporation) depend on the output of a 1 dimensional (1D) edge detector, and simply measure the distance between a pair of edge points chosen by the user. This approach is inherently limited by its 1D nature and works well only when measuring regular shapes under controlled and known conditions where the interest points have been manually specified. Furthermore, the orientation of the object and the direction of the measurement need to be aligned for accurate results.

FIG. 1A illustrates such an edge probe based caliper tool, according to the prior art. As may be seen, in the left example, the caliper tool is aligned with the object to be measured, and may provide an accurate measure, whereas in the right example, the caliper tool is not aligned with the object, and thus, measurement error is introduced, e.g., due to the fact that the caliper measures an oblique distance.

Multiple edge probe based clamp tools (for example the VDM Clamp Max Horizontal tool, also provided by National Instruments Corporation) extend the idea of the caliper by using multiple edge probes and choosing (in the case of a "max clamp" configuration) the maximum distance found between a pair of edge points. However, this is a mere extension of the 1D approach and still does not truly analyze the underlying 2D shape to make decisions. The limitations of this approach include:

a. Accuracy: The accuracy is limited by the fact that edge probes are limited in resolution in that there is a gap between successive edges defined by pairs of clamp points, and so every point is not covered in the process. FIG. 1B illustrates a multiple edge probe based clamp tool, according to the prior art. As may be seen, in this example, due to the discrete positions of the edges along which measurements are made, the maximum width of the object, indicated by the arrows, is missed.

b. Sensitivity to alignment: Since the tool does not analyze the 2D shape, the measurement accuracy is dependent on the direction of the search region. FIG. 1C illustrates such direction dependent accuracy of the multiple edge probe based clamp tool of FIG. 1B, according to the prior art. As shown, due to misalignment of the tool with the object (a screw), the left example returns inaccurate measurements compared to the right example. In other words, in the left example, the measurements are not orthogonal to the screw's primary axis, and thus, do not accurately measure the width(s) of the object.

c. Noise filtering: The tool is affected by noisy regions and provides no robust capability of filtering out small problem areas. FIG. 1D illustrates noise dependent accuracy of the multiple edge probe based clamp tool of FIG. 1B, according to the prior art. As FIG. 1D shows, due to the noisy (fuzzy) edges of the circle being measured, the endpoints of the measurement edges are not consistent, and are not reliable indicators of the circle's actual boundaries.

d. Lack of options: Sometimes users require flexibility based on particular combinations of edge polarity, i.e., whether the edge is detected as a transition from light-colored pixels to dark-colored pixels (falling edge), or the converse (rising edge), or either (any), and allowed misalignment to the search direction while measuring if desired. Current tools provide no such capabilities.

e. Validity of configuration: A good measurement tool should be able to reject an invalid configuration which might have been created by mistake. Currently available tools fail to address this problem as they do not analyze the shape in detail. FIG. 1E illustrates an invalid configuration of the multiple edge probe based clamp tool of FIG. 1B, according to the prior art. One needs to visualize the two arms of a clamp coming in from top and bottom to clamp the object. However, it is obvious that the bottom clamping face is going through the object, which is physically impossible. Thus, in this example, the tool incorrectly fails to "clamp" the object.

Thus, improved tools for machine vision based measurements are desired.

SUMMARY

Various embodiments of a machine vision based automatic maximal clamp measurement tool are described.

Curves, which may also be referred to as edges or contours, may be detected in a received image, e.g., in a specified region of interest (ROI). The curves or edges may be detected via any techniques desired. The curves/edges may correspond to or define an object, a portion of an object, or multiple objects (or a portion of multiple objects) in the image. Each curve may include respective curve points, and so the plurality of curves may include a plurality of curve points. Note that the detected curves (that define the object(s) in the image) may be considered/analyzed in light of various constraints, conventions, or conditions that may be specified by the user. For example, curves may have a "polarity", which refers to whether a curve (or edge/contour) includes or is characterized by a transition from dark to light pixels or light to dark while traversing in the ROI's direction (which is generally transverse to the curve). The ROI's (search) direction may be defined when the user (or program) specifies the ROI. For example, generally the ROI is a rectangle (although other shapes may be used as desired), which the user draws with a mouse, e.g., by dragging from a top left corner point to a bottom right corner point, etc. The draw/drag operation defines the ROI direction according to a specified convention. Thus, for example, in one embodiment, dragging from left to right specifies a 0 degree oriented ROI while dragging right to left specifies a 180 degree orientation. Subsequently (in this embodiment) one may rotate the ROI say, anticlockwise by 45 degree, and so the 0 degree ROI search direction becomes 45 degrees.

Accordingly, given an ROI direction, a curve (or edge) whose cross-section transitions from dark to light (when traversing the curve in the ROI direction, e.g., orthogonal to the curve) is referred to as a rising edge (has a rising polarity), whereas a curve (or edge) with a transition from light to dark is referred to as a falling edge (has a falling polarity). A specified polarity of "any" means that the curve can be either rising or falling. Thus, to determine and measure valid "clamps" on the object(s), pairs of curves may be determined for candidate clamps, where each pair has a start (e.g., proximal) curve and an end (e.g., distal) curve with respect to the ROI direction. The measured distance is from the start curve to the end curve (specified by clamp points), as defined by the ROI direction and angle tolerance. In other words, the clamp distance is measured along the ROI direction within the angle tolerance. In some embodiments, the clamp points may correspond to a clamp angle that deviates from the ROI direction, but does so within the angle tolerance. Thus, a clamp angle may be determined that corresponds to the first point pair, and the determined distance between the first point pair may be along a direction specified by the clamp angle, as discussed in more detail below.

In some embodiments, the curves may be analyzed and validated. For example, in one embodiment, given any constraints, e.g., specified by the user or some other process or entity, heuristics may be applied to confirm that the constraints are not violated, illegal physical configurations are prohibited, special cases handled correctly, and so forth.

One example of a configuration constraint is that given an ROI (search) direction, for any considered pair of curves (for candidate clamps) the start curve cannot be further along the ROI direction than the end curve. In other words, given an ROI direction, the start curve cannot be further away than the end curve. Note that these constraints may also be applicable when there are multiple objects.

Moreover, in some embodiments, the curves may be filtered based on edge (curve) polarity. As noted above, the polarity for the starting curve and ending curve of any found clamp may be specified, e.g., as an input. Consider the polarity specification to be ANY/ANY (start/end). Under this constraint curves of all polarities may be considered, and thus, the tool may proceed to find clamps by considering all the curves. However, if the specified polarity constraint is start—RISING/end—FALLING, then the start curve should have a dark to bright edge and the end curve should have a bright to dark edge. Accordingly, the tool may look for curves/edges of the correct polarities and filter out the others. Visualization of the "outside-in" grip simulated by the clamp can clarify why start and end curves of the correct polarities are used.

In some embodiments, the validating and filtering may be performed simultaneously. In other words, the curve polarity and configuration together may determine which curves are ultimately selected for processing.

A determination may be made as to whether the curves were determined to be valid. If the curves were determined to not be valid, then an error may be output (e.g., to a user, log file, etc.). Conversely, if the curves were determined to be valid, then the method may proceed as follows.

A convex hull may be determined based on the respective curve points. In other words, a minimum convex boundary enclosing the detected curves (or corrected/modified versions thereof), i.e., the object(s) or portion of the object(s) in the image, may be determined. Any techniques for determining the convex hull may be used as desired, such techniques being known in the art.

Calibration may be applied during, or as part of, or in addition to, any of the steps or elements in the method. For example, note that images are affected by the relationship between the camera, lens, and the object(s), causing such effects as perspective, distortion, scaling, and so forth. Thus, at various points in the process disclosed herein, points, curves, or distances in pixel-space, may be converted or corrected, thereby generating corresponding corrected points, curves, or distances, i.e., in "corrected pixel-space". Moreover, "real-world" measurements of distance (e.g., in mm) are generally different from pixel-space and corrected pixel-space measurements of distance (i.e., in image space). A mapping between these three coordinate systems (and thus between corresponding distances) may be available along with the image in the form of calibration data. Thus, when such a mapping is available, the present technique/tool may be capable of providing not only accurate (i.e., corrected) pixel measurements, but real-world measurements, as well. Moreover, in some embodiments, some method elements may operate on points, curves, or distances, in (uncorrected) pixel-space or corrected pixel-space, and so applying calibration may at times include converting or mapping the points, curves, or distances, from real-world space back to pixel-space or corrected pixel space, as needed or desired.

Accordingly, calibration information, if present, may optionally be used to first correct the curve points for distortions caused by the image capturing process and/or camera lens imperfections. Thus, the above plurality of curves may each comprise respective curve points in pixel-space, and the method may further include correcting the curve points in pixel-space of each of the plurality of curves using calibration information, thereby generating a corresponding plurality of corrected curve points in corrected pixel-space, i.e., thereby generating corresponding corrected curves. This is done because the corrected pixel-space curve points may be significantly different from the visible pixel-space points, i.e., as captured via the image acquisition process.

Accordingly, the hull may be computed based on these "corrected" pixels, which correct the points for distortions, e.g., caused by the camera setup and lens, etc. As noted above, "pixel-space" refers to the uncorrected image space, including curve points (pixels) and background. Thus, regarding the convex hull, work may be performed in the corrected pixel-space (which, it should be noted, is not the same as real-world space), where distortions from the lens and setup are removed, and so the object (or objects') shape is correct. Note that transformations from this corrected pixel-space to real-world space, scaling, unit conversions, axis, and/or origin information, among others, may be used. Thus, in some embodiments, at any of various points in the process, conversions or mappings between any of these three difference spaces—"pixel", "corrected pixel", and "real-world"—may be used as appropriate or as desired.

The convex hull may be analyzed based on input parameters and a specified region of interest (ROI). Note that since the ROI is defined in the pixel-space, suitable computations may be performed to incorporate the effects of calibration information, if present, on the relationship between the ROI and the convex hull. For example, since the ROI is always in the pixel-space, when the relation between the ROI and the hull points are checked or determined, the hull points may be converted back to pixel-space for the computations. As noted above, input parameters may include various constraints or conditions specified by the user.

One or more candidate antipodal point pairs may be determined. Antipodal point pairs (in a 2D sense) are pairs of points (on respective curves) which admit anti-parallel tangents/lines of support. Note that this aspect may be purely dependant on the shape of the (convex) object(s). In some embodiments, the ROI is in the pixel-space, and so every corrected point may need to be temporarily converted back to pixel-space and its relation to the ROI checked. However, the antipodal pairs found next may still be in the corrected pixel-space. Thus, in one embodiment, the method may include converting the one or more candidate antipodal point pairs from corrected pixel-space to pixel-space, thereby generating one or more converted candidate antipodal point pairs. A first point pair of the one or more (possibly converted) candidate antipodal point pairs of the convex hull may be selected based on one or more specified constraints. Said another way, an appropriate (first point) pair of the determined (and possibly converted) candidate antipodal point pairs may be selected based on one or more specified constraints, e.g., subject to a specified angle tolerance. For example, candidate appropriate pairs may be chosen based on the constraints imposed by the angle tolerance and the ROI direction, e.g., along a direction specified by a clamp angle, discussed below, and within these constraints, the "best" pair may be selected. The selected first point pair may be referred to as clamp points. Thus, in the case of a "max clamp", the candidate pairs are those with the (local) maximum distances, and the best pair is the candidate pair with the minimum distance (of the local maximums). The selected pair of points may define or specify positions between which the distance may be measured from the start curve to the end curve (specified by clamp points), e.g., as defined by the ROI direction and angle tolerance, and more specifically, in accordance with a "clamp angle", described below.

In other words, as noted above, these angles and distances are defined in the pixel-space and thus appropriate computations may be performed to convert the selected candidate points from corrected pixel space to the pixel-space, when calibration information is present. As noted above, the "clamp distance" to be measured corresponds to the distance between the found antipodal points, i.e., the first point in the pair, and the second point in the pair. However, in some embodiments, when ROIs "cut-through" objects, they may impose additional constraints on what comprises a valid clamp.

Note that each antipodal point pair can have multiple distances (e.g., based on the valid angle ranges allowed for the pair). Thus, the maximum amongst these distances may be used for that pair. Then over all such antipodal pair (maximum) distances, the pair with the minimum distance may be selected for the "max clamp". In other words, for every antipodal pair, the maximum distance (over all distances at various allowed angles) is determined, and then the minimum of such maximum distances over all pairs is selected. Thus, the "local" maximum refers to the per-pair maximum. Note that a "min clamp" would utilize a different approach.

In some embodiments, subpixel accurate refinement of the determined positions (first point pair) may be performed, thereby generating a refined (first) point pair. Said another way, further processing may be performed on the image to refine the accuracy of the positions, i.e., the geometric positions of the pair of points. In one embodiment, an edge detector (e.g., different from that mentioned above) may be used for the subpixel accurate refinement. For example, a VDM IMAQ 1D Edge Detector, provided by National Instruments Corporation, or a variant thereof, may be used.

A distance between the clamp faces defined by positions of the (possibly converted and/or refined) first point pair may be determined. In some embodiments, the clamp points may correspond to a clamp angle that deviates from the ROI direction, but does so within the angle tolerance. Thus, a clamp angle may be determined that corresponds to the first point pair, and the determined distance between the first point pair may be along a direction specified by the clamp angle, as discussed in more detail below.

In other words, a distance between the (possibly converted and/or refined) first point pair may be determined along a direction specified by the clamp angle. This distance may be referred to as the clamp distance. As noted above, in some embodiments, this distance may refer to that between opposite faces/surfaces of the clamp corresponding to the point pair (within specified angle tolerances and along a specific clamp angle, as mentioned above), as opposed to the actual point to point distance. In other words, the shortest distance between clamp faces may be less than the distance between the two points.

In some embodiments, calibration may be applied. For example, in one embodiment, the above determining a distance between the first point pair along a direction specified by the clamp angle generates a pixel-space distance. In some embodiments, the method may include converting the first point pair from pixel-space to real-world space, thereby generating a real-world point pair, then determining a distance between the real-world point pair along the direction specified by the clamp angle, thereby generating a real-world distance.

Finally, any or all results of the above process may be stored or output, e.g., to a display or storage device. For example, (one or more of) the first point pair, the pixel-space distance, the real-world point pair, the real-world distance, and the clamp angle may be stored. The first point pair, the pixel-space distance, the real-world point pair, the real-world distance, and/or the clamp angle may be used to analyze or otherwise characterize the object(s) in the image.

Thus, embodiments of the invention may provide improved machine vision based measurements.

BRIEF DESCRIPTION OF THE DRAWINGS

A better understanding of the present invention can be obtained when the following detailed description of the preferred embodiment is considered in conjunction with the following drawings, in which:

FIGS. 4A and 4B illustrate machine vision systems, according to embodiments of the present invention;

Figure 1A:
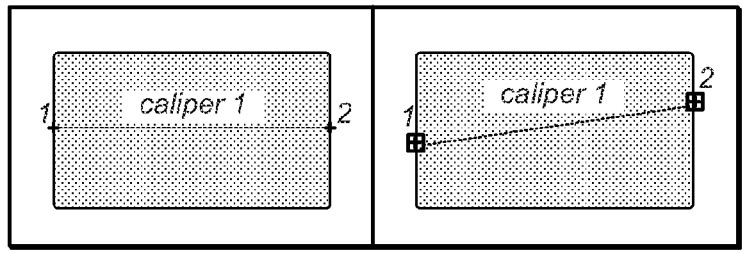
FIG. 1A illustrates an edge probe based "caliper" tool, according to the prior art.
Figure 1B:
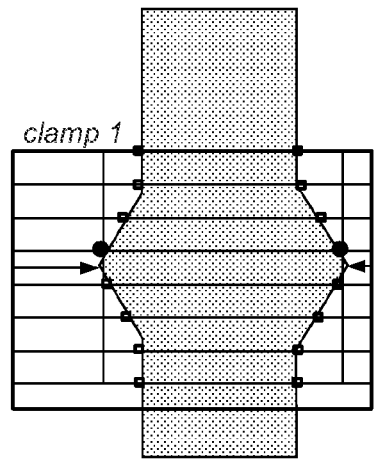
FIG. 1B illustrates a multiple edge probe based clamp tool, according to the prior art.
Figure 1C:
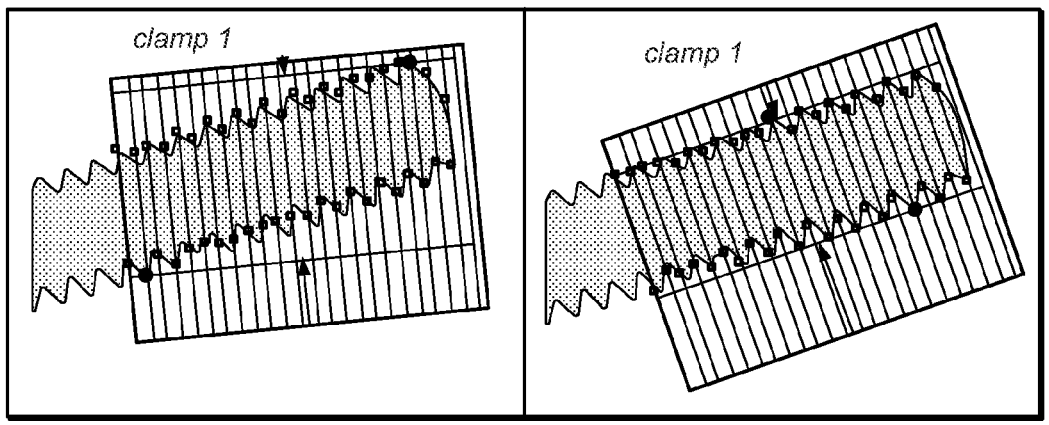
FIG. 1C illustrates direction dependent accuracy of the multiple edge probe based clamp tool of FIG. 1B, according to the prior art.
Figure 1D:
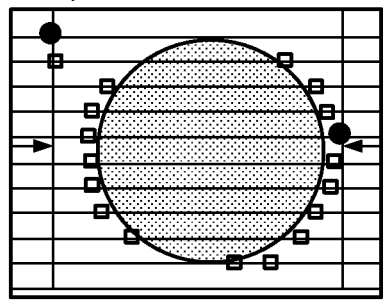
FIG. 1D illustrates noise dependent accuracy of the multiple edge probe based clamp tool of FIG. 1B, according to the prior art.
Figure 1E:
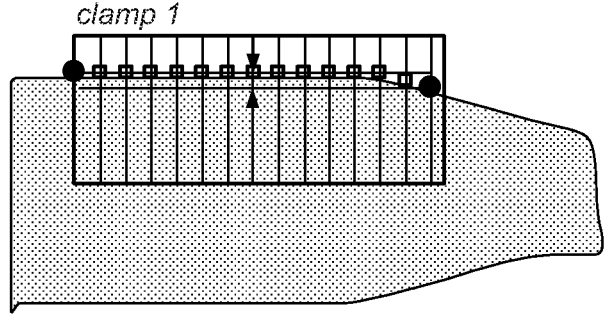
FIG. 1E illustrates an invalid configuration of the multiple edge probe based clamp tool of FIG. 1B, according to the prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Provisional Application Ser. No. 61/512,212, titled "Machine Vision Based Automatic Maximal Clamp Measurement Tool", filed Jul. 27, 2011.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment", issued on Jan. 2, 1996.

U.S. Pat. No. 6,173,438 titled "Embedded Graphical Programming System" issued on Jan. 9, 2001.

U.S. Pat. No. 6,219,628 titled "System and Method for Configuring an Instrument to Perform Measurement Functions Utilizing Conversion of Graphical Programs into Hardware Implementations," issued on Apr. 17, 2001.

U.S. Pat. No. 7,210,117 titled "System and Method for Programmatically Generating a Graphical Program in Response to Program Information," issued on Apr. 24, 2007.

TERMS

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Functional Unit—any of various hardware means for executing or implementing program instructions, including one or more processors, programmable hardware elements, e.g., FPGAs, ASICs (Application Specific Integrated Circuits), programmable logic, etc., or any combinations thereof. Note that the term "computer" may refer to any device that includes a functional unit.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/System-Build™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Figure 2A:
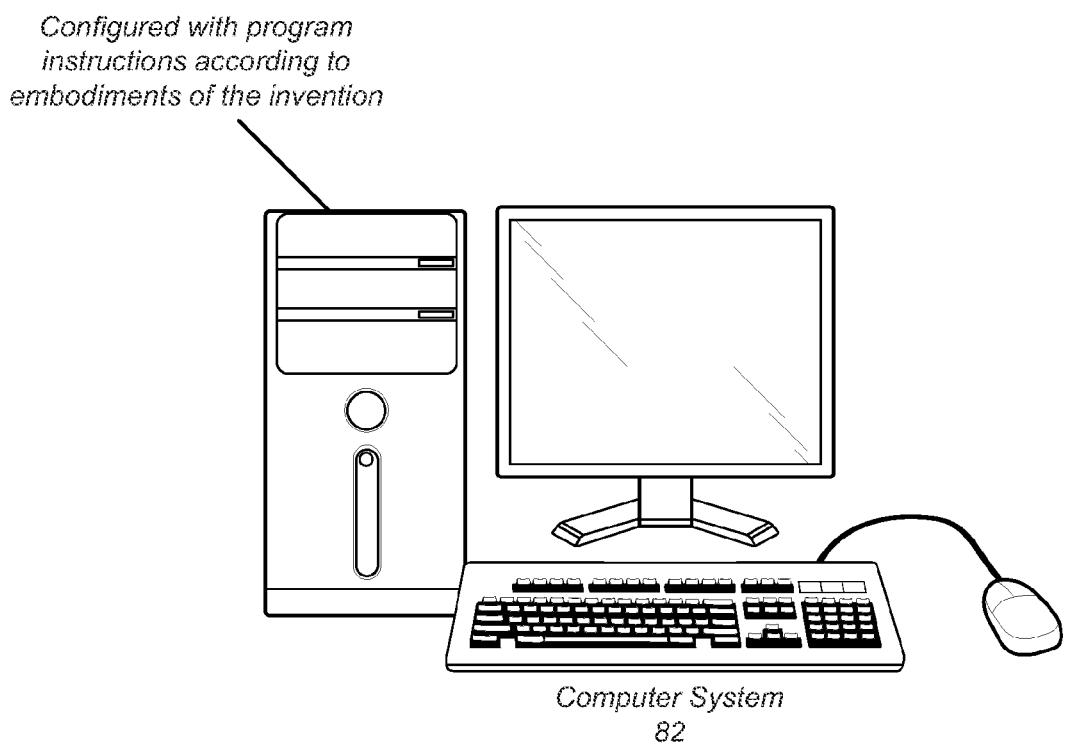
FIG. 2A illustrates a computer system configured to implement embodiments of the present invention.

FIG. 2A—Computer System

FIG. 2A illustrates a computer system 82 configured to implement embodiments of the present invention. Embodiments of a method for measuring distances in an image are described below. Some embodiments of the present invention may be implemented by software programs, i.e., via program instructions. Note, however, that other embodiments may be implemented via hardware, e.g., an ASIC (Applicant Specific Integrated Circuit), or programmable hardware, such as an FPGA (Field Programmable Gate Array), among others. Further embodiments may be implemented via a combination of software and hardware.

As shown in FIG. 2A, the computer system 82 may include a display device operable to display a graphical user interface for one or more programs of the present invention. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more programs, e.g., graphical programs, which are executable to perform the methods described herein. Additionally, the memory medium may store a programming development environment application used to create and/or execute such programs, as well as data, e.g., image data, configuration data, etc. The memory medium may also store operating system software, as well as other software for operation of the computer system. Various embodiments further include receiving or storing instructions and/or data implemented in accordance with the foregoing description upon a carrier medium.

Figure 2B:
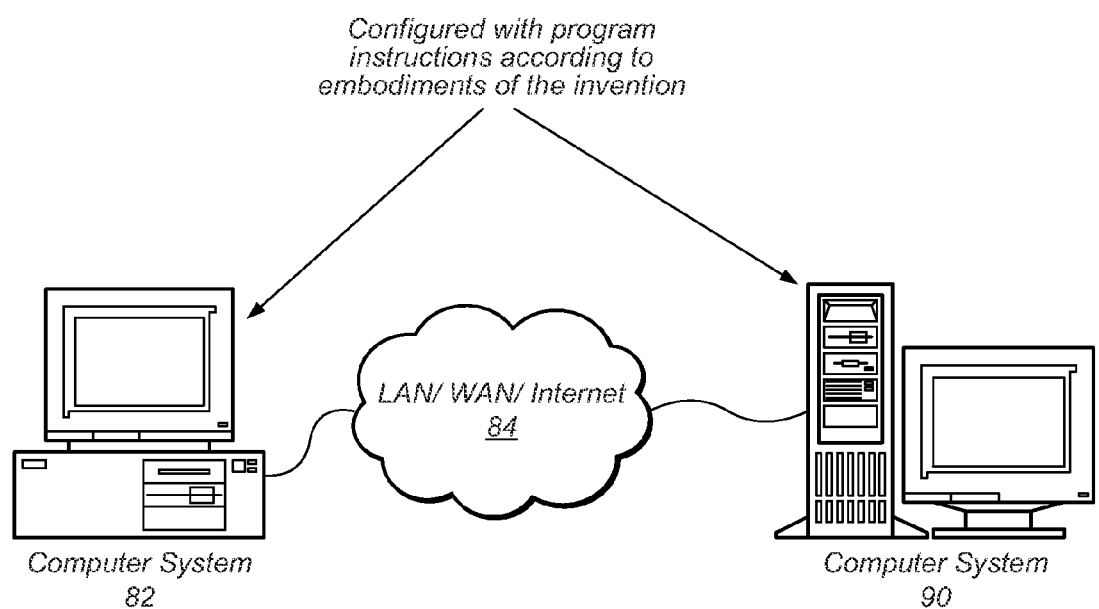
FIG. 2B illustrates a network system comprising two or more computer systems that may implement an embodiment of the present invention.

FIG. 2B—Computer Network

FIG. 2B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program (or programs) in a distributed fashion. For example, computer 82 may execute a first portion of the program (or programs) and computer system 90 may execute a second portion of the program (or programs). As another example, computer 82 may display the graphical user interface of a program and computer system 90 may execute the functional code of the program.

In one embodiment, the graphical user interface of the program may be displayed on a display device of the computer system 82, and the functional code may execute on a device coupled to the computer system 82. The device may include a programmable hardware element and/or may include a processor and memory medium which may execute a real time operating system. In one embodiment, the program may be downloaded and executed on the device. For example, an application development environment with which the program is associated may provide support for downloading a program for execution on the device in a real time system. As noted above, in some embodiments, the programs may include one or more graphical programs, such as graphical programs developed under the LabVIEW™ graphical program development environment provided by National Instruments Corporation. Further information regarding graphical programs may be found in U.S. Pat. No. 5,481,741 titled "Method and Apparatus for Providing Attribute Nodes in a Graphical Data Flow Environment", which was incorporated by reference above.

Exemplary Systems

Embodiments of the present invention may be used in any technical domain in which machine vision is used. For example, embodiments may be involved with performing test and/or measurement functions; controlling and/or modeling instrumentation or industrial automation hardware; modeling and simulation functions, e.g., modeling or simulating a device or product being developed or tested, etc. Exemplary test applications where the program may be used include hardware-in-the-loop testing and rapid control prototyping, among others.

However, it is noted that the present invention can be used for or in relation to a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, surveillance systems, forensic systems, biometric systems (e.g., for medical or security purposes), telescopes, microscopes, etc., as well as general purpose software applications such as word processing, spreadsheets, network control, network monitoring, financial applications, games, etc.

Figure 3A:
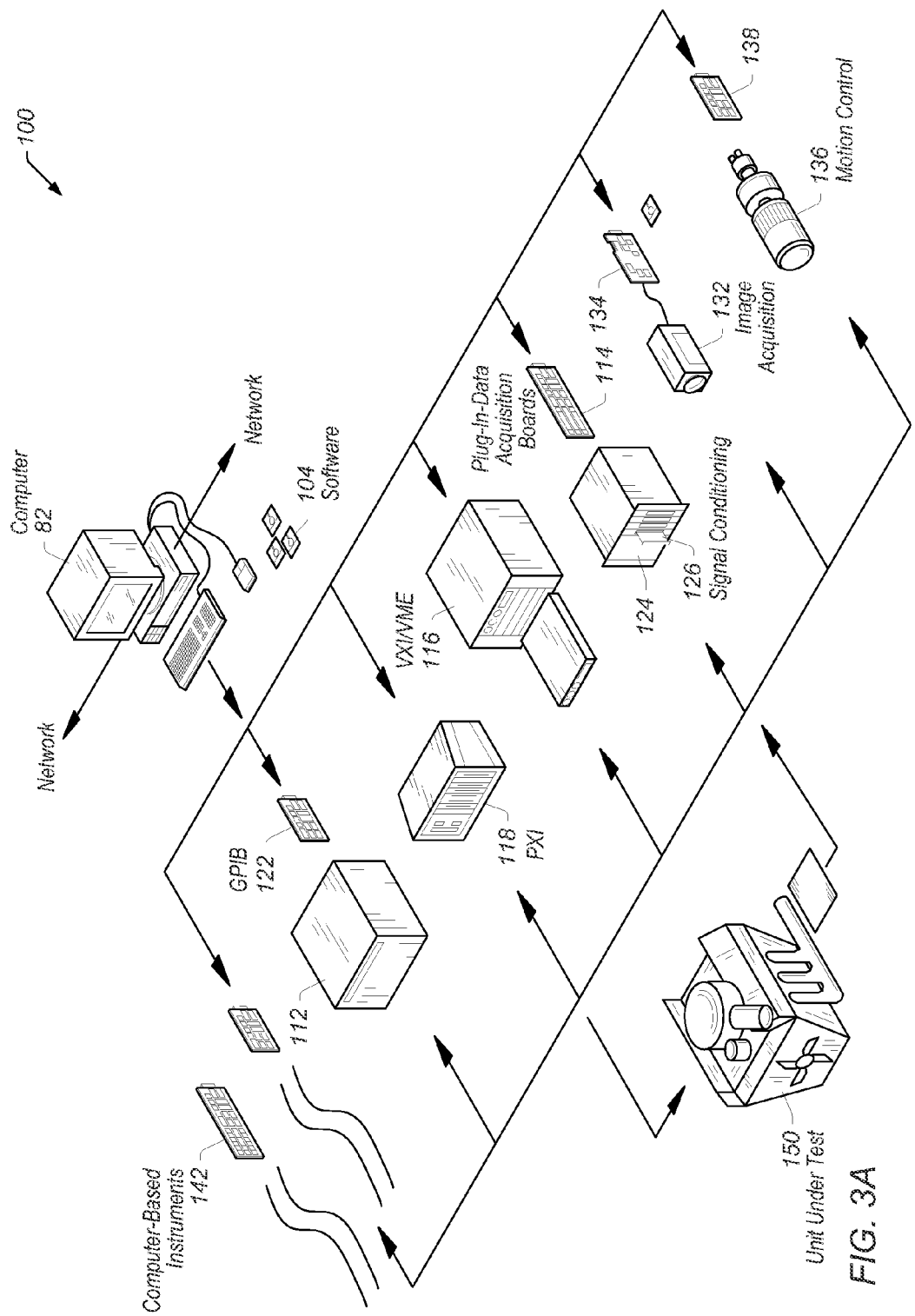
FIG. 3A illustrates an instrumentation control system, according to one embodiment of the invention.

FIG. 3A illustrates an exemplary instrumentation control system 100 which may implement or use embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure, or control a unit under test (UUT) or process 150, e.g., a product in a manufacturing process, particularly using a machine vision system.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 3B:
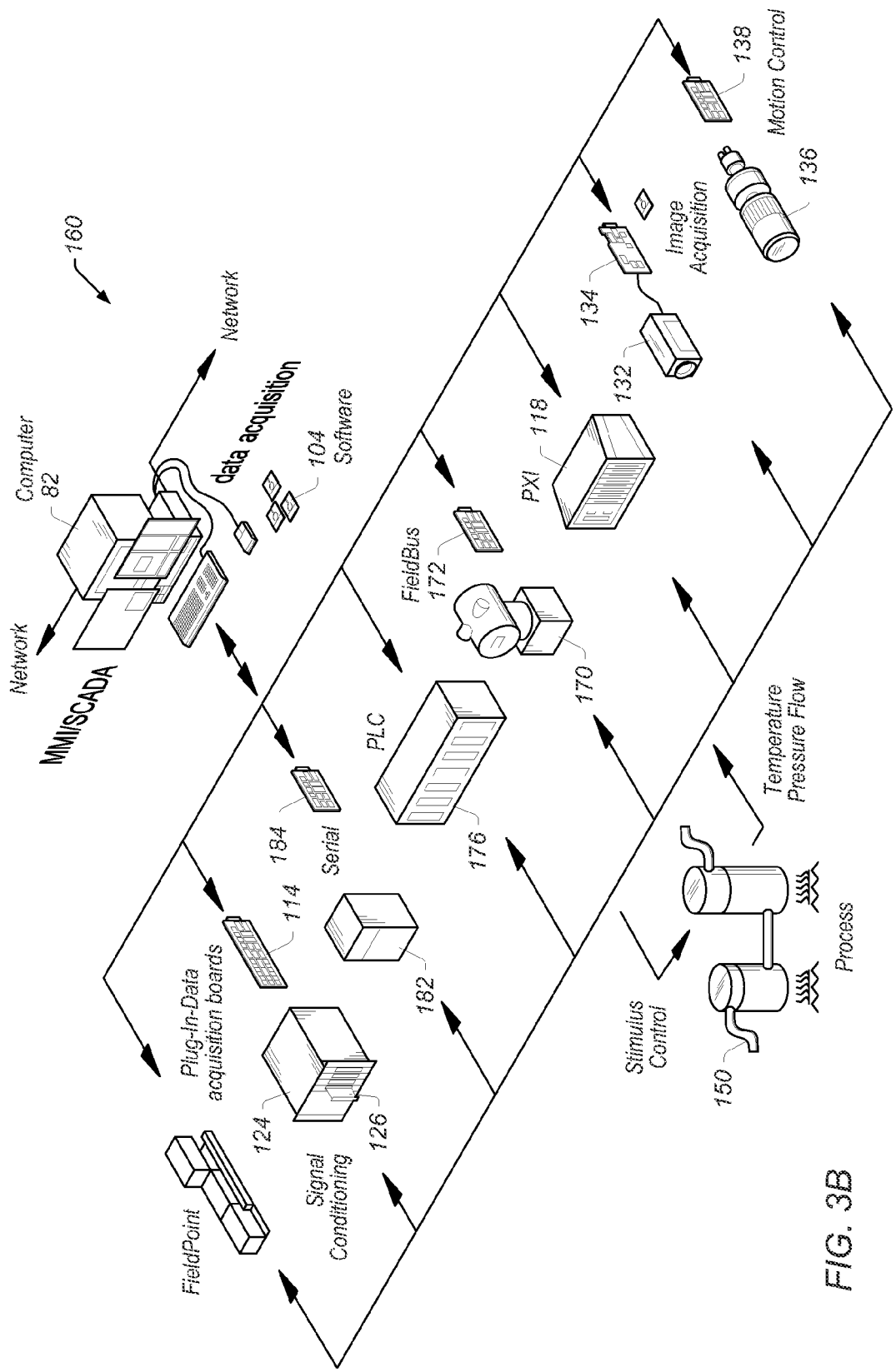
FIG. 3B illustrates an industrial automation system, according to one embodiment of the invention.

FIG. 3B illustrates an exemplary industrial automation system 160 which may implement or use embodiments of the invention. The industrial automation system 160 is similar to the instrumentation or test and measurement system 100 shown in FIG. 3A. Elements which are similar or identical to elements in FIG. 3A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, using a machine vision system.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 4A:
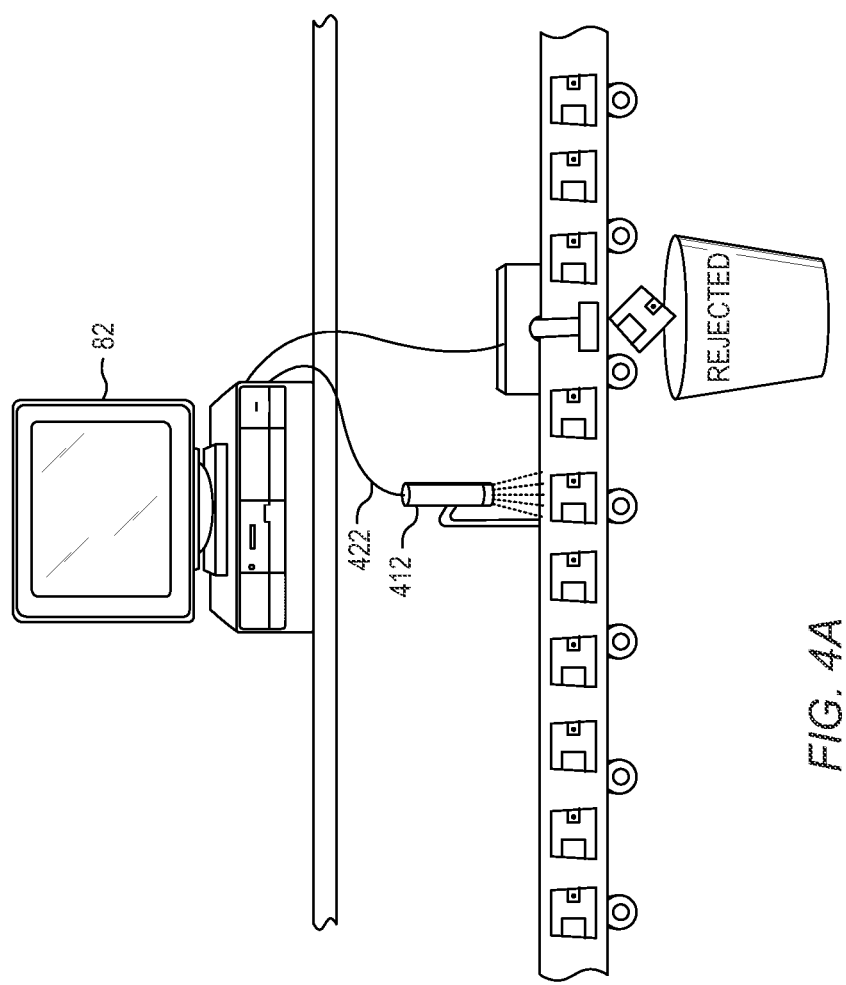

FIGS. 4A and 4B—Machine Vision Systems

FIGS. 4A and 4B illustrate exemplary vision systems, each including a vision system and a control device 13, e.g., examples of a machine vision application wherein embodiments of the present invention may be used. As may be seen in FIG. 4A, the machine vision system may include a host 82 and a video source 412, e.g., an analog or digital camera. The video source 412 preferably produces a digital video signal which includes an image or a sequence of images or video frames, or other data desired to be acquired. The digital video signal may be provided through a wire or cabling 422 to the host computer 82 for storage and/or processing. The host computer may include an image acquisition or frame grabber board (also called a video capture board). The host computer 82 preferably includes various standard components, such as at least one CPU, memory, etc. The host computer 82 may store a template image or pattern. In one embodiment, the host computer 82 may also store software which performs vision inspection, e.g., using edge detection, pattern matching, or other types of image analysis, e.g., to locate zero or more instances of the template image in the target image, or to measure and characterize aspects of the image. In the embodiment of FIG. 4A, the host computer 82 may receive the target image from the video source 412 and perform analysis on the image, e.g., via embodiments of the tool disclosed herein. However, in other embodiments, the computer 82 may receive the target image from another source, or the target image may be pre-stored on the computer.

Thus, in the machine vision application of FIG. 4A, the computer system 82 is coupled to a camera 412 and operates to receive a target image and perform analysis of the target image. The computer system of FIG. 4A may be programmed according to one embodiment of the present invention to perform machine vision based measurements on acquired images. The techniques of the present invention may be used in various types of machine vision applications. For example, the computer 82 may be embodied in various form factors and/or architectures, e.g., a robot, among others. It is also noted that the tools and techniques described herein may be performed in any of various manners, either in software, programmable logic, or hardware, or a combination thereof.

In the embodiment of FIG. 4B, the processor and memory are incorporated in a smart camera 110, i.e., where the smart camera includes the camera, the processor and memory, and a chassis containing the camera and the processor and memory. In other embodiments, in addition to, or instead of, the processor, the smart camera may include a programmable hardware element, e.g., a field programmable gate array (FPGA), an application specific integrated circuit (ASIC), etc. More generally, the smart camera (or system) may include a functional unit configured to perform the techniques disclosed herein.

Similar to the embodiment of FIG. 4A, in this embodiment, the processor (or functional unit) in the smart camera 110 may perform the desired image processing functions, including optionally performing an operation based on determined characteristics of the image, e.g., determining control data. Thus, in the embodiments of FIGS. 4A and 4B, the processor (or functional unit) in the smart camera 110 or the computer system 82 may perform at least a portion of the methods and techniques described herein, and/or may control the control device 136.

In the embodiments of FIGS. 3A, 3B, 4A, and 4B, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network.

Thus, more generally, the present techniques may be deployed on any type of vision or analysis platform desired, and may be implemented or performed via any type of functional unit(s), e.g., via one or more processors, programmable hardware elements, ASICs (Application Specific Integrated Circuits), programmable logic, etc., or any combinations thereof.

Figure 5:
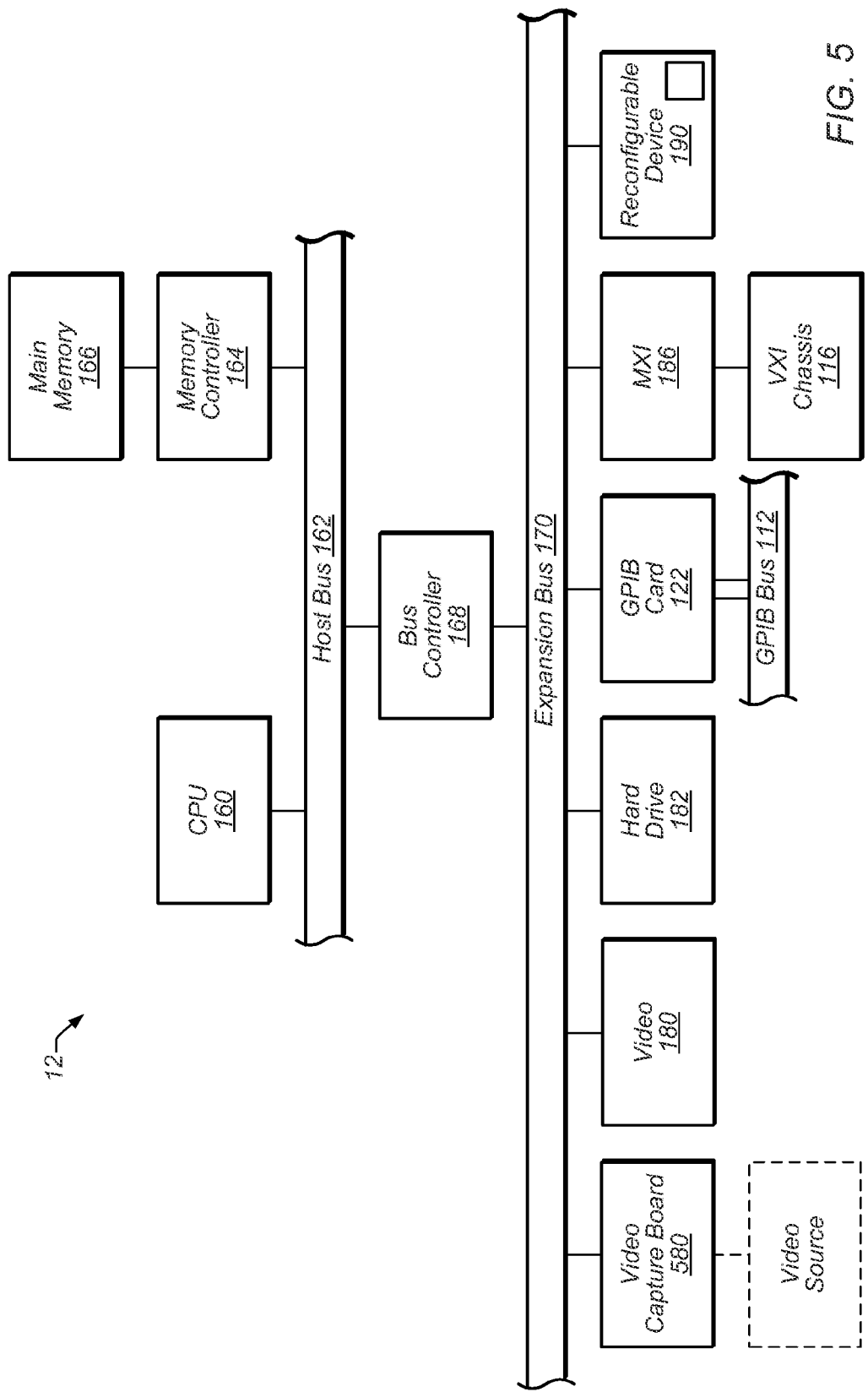
FIG. 5 is an exemplary block diagram of the computer systems of FIGS. 2A, 2B, 3A, 3B, and 4A.

FIG. 5—Computer System Block Diagram

FIG. 5 is a block diagram representing one embodiment of the computer system 82 and/or 90 illustrated in FIGS. 2A and 2B, or computer system 82 shown in FIG. 3A or 3B. It is noted that any type of computer system configuration or architecture can be used as desired, and FIG. 5 illustrates a representative PC (Personal Computer) embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program instructions executable to implement embodiments of the present invention, as well as images that may be analyzed or operated on by the program instructions. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170, as well as a video capture board 580 operable to capture images from a video source.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the program on the device 190. The deployed program may take the form of program instructions or data structures that directly represents the program. In some embodiments, the program may be or include a graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program. One exemplary type of graphical program is that created using the LabVIEW graphical programming environment, provided by National Instruments Corporation. Graphical software programs which perform data acquisition, analysis and/or presentation, e.g., for measurement, instrumentation control, industrial automation, modeling, or simulation, such as in the applications shown in FIGS. 3A and 3B, may be referred to as virtual instruments.

Machine Vision Based Maximal Clamping Tool

The below describes various embodiments of a tool (and related technique) for making measurements in images. The tool measures distances by mimicking the action of a physical clamp with parallel gripping faces. More specifically, the tool simulates an "outside-in" closing grip and returns the maximum distance measured this way. In some embodiments, this is done automatically by performing geometric analysis of the underlying shape or object (and constituent curves), e.g., subject to user specified options. Additionally, pre-processing options may allow users to filter out noise and small spurious regions effectively. A graphical user interface (GUI) may be provided whereby the tool may be configured. In other words, the tool may include (and display) a GUI for user configuration of parameters for the tool, e.g., angle tolerance, region of interest, and so forth. The tool may then operate in accordance with the configured parameters. In some embodiments, the tool may be incorporated within a machine vision system, e.g., as an integral part, or as a plugin. Alternatively, the tool may be a standalone program.

Further details regarding the tool and its use are provided below.

Figure 6:
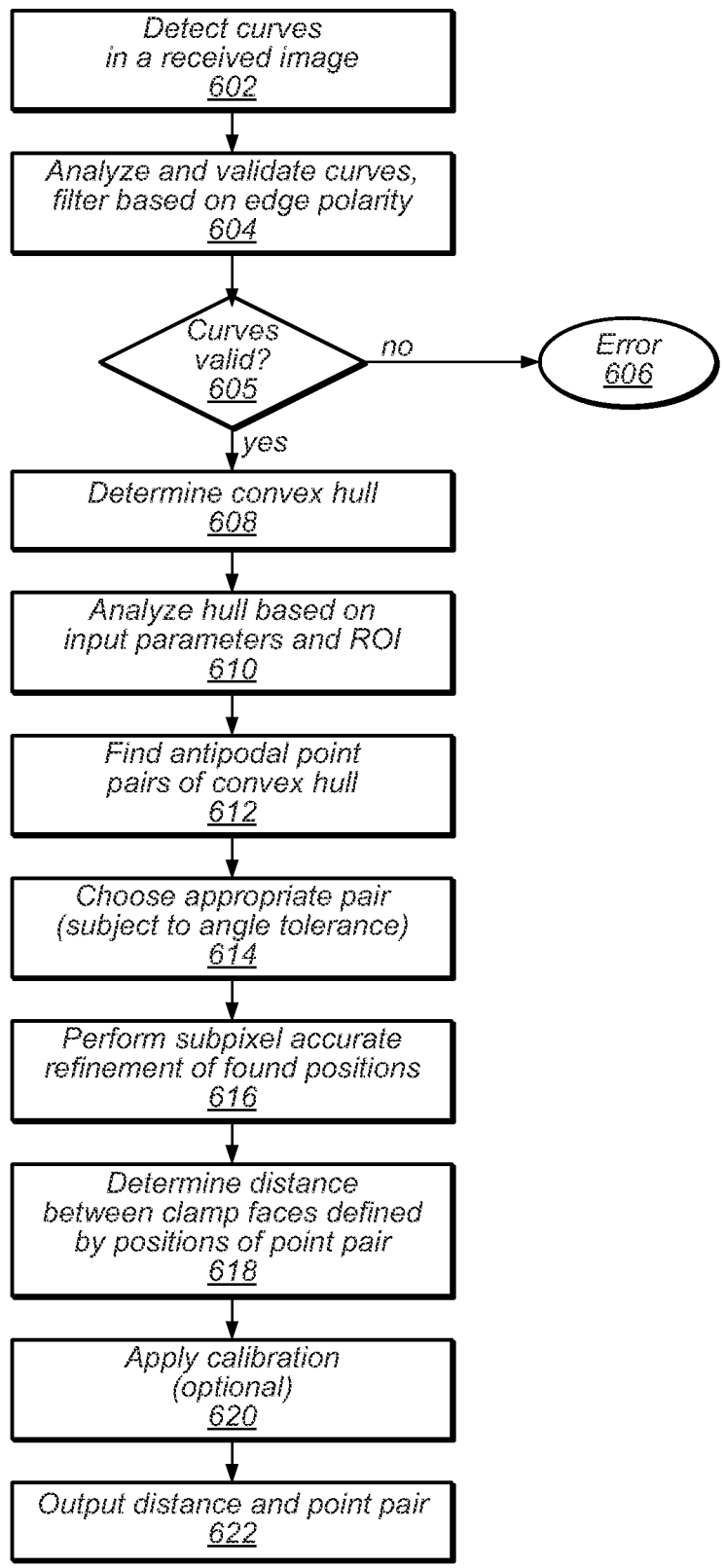
FIG. 6 is a flowchart diagram illustrating one embodiment of a method for measuring distances in an image, according to one embodiment.

FIG. 6—Method for Measuring Distances Via a Machine Vision Based Maximum Clamping Tool FIG. 6 illustrates a method for using a machine vision based tool to make measurements in an image, according to one embodiment. The method shown in FIG. 6 may be used in conjunction with any of the computer systems or devices shown in the above-described Figures, among other devices. In various embodiments, some of the method elements shown may be performed concurrently, in a different order than shown, or may be omitted. Additional method elements may also be performed as desired. As shown, this method may operate as follows.

In 602, a plurality of curves, which may also be referred to as edges or contours, may be detected in a received image, e.g., in a specified region of interest (ROI). The curves may be detected via any techniques desired. The curves may correspond to or define one or more objects (or portion of an object or multiple objects, an exemplary illustration of which is provided in FIG. 11, described below) in the image. Each curve may include respective curve points, and so the plurality of curves may include a plurality of curve points.

Note that the detected curves (that define the object(s) in the image) may be considered/analyzed in light of various constraints, conventions, or conditions that may be specified by the user. For example, curves may have a "polarity", which refers to whether a curve includes or is characterized by a transition from dark to light pixels or light to dark while traversing in the ROI's direction (which is generally transverse to the curve/edge). The ROI's (search) direction may be defined when the user (or program) specifies the ROI. For example, generally the ROI is a rectangle (although other shapes may be used as desired), which the user draws with a mouse, e.g., by dragging from a top left corner point to a bottom right corner point, etc. The draw/drag operation defines the ROI direction according to a specified convention. Thus, for example, in one embodiment, dragging from left to right specifies a 0 degree oriented ROI while dragging right to left specifies a 180 degree orientation. Subsequently (in this embodiment) one may rotate the ROI say, anticlockwise by 45 degree, and so the 0 degree ROI search direction becomes 45 degrees.

Accordingly, given an ROI direction, a curve (or edge) whose cross-section transitions from dark to light (when traversing the curve in the ROI direction) is referred to as a rising edge (has a rising polarity), whereas a curve (or edge) with a transition from light to dark is referred to as a falling edge (has a falling polarity). A specified polarity of "any" means that the curve can be either rising or falling. Thus, to determine and measure valid "clamps" on the object, pairs of curves may be determined for candidate clamps, where each pair has a start curve and an end curve with respect to the ROI direction. The measured distance is from the start curve to the end curve (specified by clamp points), as defined by the ROI direction within the angle tolerance, or clamp angle, discussed below.

In 604, the curves may be analyzed and validated. For example, in one embodiment, given any constraints, e.g., specified by the user, heuristics may be applied to confirm that the constraints are not violated, illegal physical configurations are prohibited, special cases handled correctly, and so forth.

Figure 11:
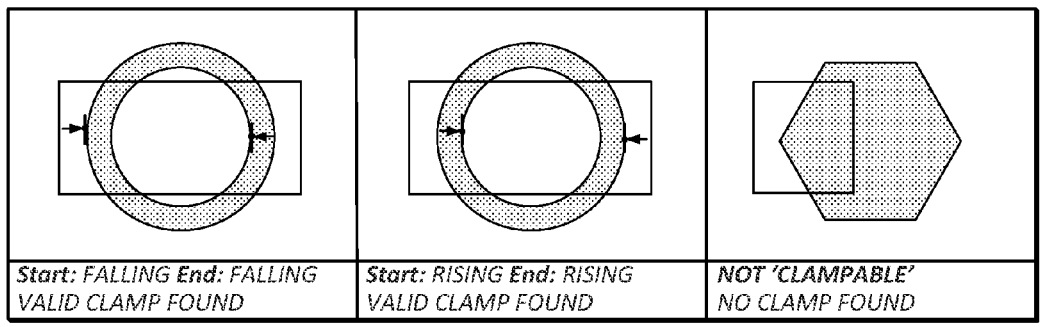
FIG. 11 illustrates impact of positioning of the search region of interest (ROI) on the clamping process, according to one embodiment.

One example of a configuration constraint is that given an ROI (search) direction, for any considered pair of curves (for candidate clamps) the start curve cannot be further along the ROI direction than the end curve. In other words, given an ROI direction, the start curve cannot be further away than the end curve. Note that these constraints may also be applicable when there are multiple objects, such as shown in FIG. 11, and described below.

Moreover, in some embodiments, the curves may be filtered based on edge polarity. As noted above, the edge polarity for the starting curve and ending curve of any found clamp may be specified, e.g., as an input. Consider the polarity specification to be ANY/ANY (start/end). Under this constraint curves of all polarities may be considered, and thus, the tool may proceed to find clamps by considering all the curves. However, if the specified polarity constraint is start—RISING/end—FALLING, then the start curve should have a dark to bright edge and the end curve should have a bright to dark edge. Accordingly, the tool may look for curves of the correct polarities and filter out the others. Visualization of the "outside-in" grip simulated by the clamp can clarify why start and end curves of the correct polarities are used.

In some embodiments, the validating and filtering may be performed simultaneously. In other words, the curve polarity and configuration together may determine which curves are ultimately selected for processing.

In 605, a determination may be made as to whether the curves were determined to be valid (in 604). If the curves were determined to not be valid, then an error may be output (e.g., to a user, log file, etc.), as indicated in 606. Conversely, if the curves were determined to be valid, then the method may proceed to 608.

In 608, a convex hull may be determined based on the respective curve points. In other words, a minimum convex boundary enclosing the detected curves (or corrected/modified versions thereof), i.e., the object or portion of the object in the image, may be determined. Any techniques for determining the convex hull may be used as desired, such techniques being known in the art.

Calibration may be applied during any of various steps or elements in the method. For example, note that images are affected by the relationship between the camera, lens, and the object(s), causing such effects as perspective, distortion, scaling, and so forth. Thus, at various points in the process disclosed herein, points, curves, or distances in pixel-space, may be converted or corrected, thereby generating corresponding corrected points, curves, or distances. Moreover, "real-world" measurements of distance (e.g., in mm) are generally different from the "pixel-space" (uncorrected or corrected) measurements of distance (i.e., in the image space). A mapping between these two coordinate systems (and thus between corresponding distances) may be available along with the image in the form of calibration data. Thus, when such a mapping is available, the present technique/tool may be capable of providing not only accurate (i.e., corrected) pixel measurements, but real-world measurements, as well.

Accordingly, calibration information, if present, may optionally be used to first correct the curve points for distortions caused by the image capturing process and/or camera lens imperfections. Thus, the above plurality of curves may each comprise respective curve points in pixel-space, and the method may further include correcting the curve points in pixel-space of each of the plurality of curves using calibration information, thereby generating a corresponding plurality of corrected curve points in corrected pixel-space, i.e., thereby generating corresponding corrected curves. This is done because the "corrected" (pixel-space) curve points may be significantly different from the visible "pixel-space" points, i.e., as captured via the image acquisition process.

Thus, in one embodiment, the hull may be computed based on these "corrected" pixels, which correct the points for distortions, e.g., caused by the camera setup and lens, etc. As indicated by the above, the "pixel-space" refers to the uncorrected image space, including curve points (pixels) and background). Thus, regarding the convex hull, work may be performed in the "corrected pixel-space" (which, it should be noted, is not the same as "real-world" space), where distortions from the lens and setup are removed, and so the object (or objects') shape is correct. Note that transformations from this "corrected pixel-space" to "real-world space", scaling, unit conversions, axis, and/or origin information, among others, may be used. Thus, in some embodiments, at various points in the process, conversions between any of these three difference spaces—"pixel", "corrected pixel", and "real-world"—may be used as appropriate or as desired.

In 610, the convex hull may be analyzed, e.g., based on input parameters and a specified region of interest (ROI). As noted above, input parameters may include various constraints or conditions specified by the user.

In 612, one or more candidate antipodal point pairs of the convex hull may be determined. Antipodal point pairs (in a 2D sense) are pairs of points (on respective curves) which admit anti-parallel tangents/lines of support. Note that this aspect may be purely dependant on the shape of the (convex) object(s).

In one embodiment, the method may include converting the one or more candidate antipodal point pairs from corrected pixel-space to pixel-space, thereby generating one or more converted candidate antipodal point pairs.

In 614, a first point pair of the one or more (possibly converted) candidate antipodal point pairs of the convex hull may be selected based on one or more specified constraints. Said another way, an appropriate (first point) pair of the determined (and possibly converted) candidate antipodal point pairs may be selected based on one or more specified constraints, e.g., subject to a specified angle tolerance. For example, candidate appropriate pairs may be chosen based on the constraints imposed by the angle tolerance and the ROI direction, and within these constraints, the "best" pair may be selected. The selected first point pair may be referred to as "clamp points". Thus, in the case of a "max clamp", the candidate pairs are those with the (local) maximum distances, and the "best" pair is the candidate pair with the minimum distance (of the local maximums). The selected pair of points may define or specify positions between which the distance may be measured from the start curve to the end curve (specified by clamp points), e.g., as defined by the ROI direction and angle tolerance, e.g., in accordance with a "clamp angle", described below.

Note that each antipodal point pair can have multiple distances (e.g., based on the valid angle ranges allowed for the pair). Thus, the maximum amongst these distances may be used for that pair. Then over all such antipodal pair (maximum) distances, the pair with the minimum distance may be selected for the "max clamp". In other words, for every antipodal pair, the maximum distance (over all distances at various allowed angles) is determined, and then the minimum of such maximum distances over all pairs is selected. Thus, the "local" maximum refers to the per-pair maximum. Note that a "min clamp" would utilize a different approach.

In 616, subpixel accurate refinement of the determined positions (first point pair) may be performed, thereby generating a refined (first) point pair. Said another way, further processing may be performed on the image to refine the accuracy of the positions, i.e., the geometric positions of the pair of points. In one embodiment, an edge detector (e.g., different from that used in 602 above) may be used for the subpixel accurate refinement. For example, a VDM IMAQ 1D Edge Detector, provided by National Instruments Corporation, or a variant thereof, may be used.

In 618, a distance between the clamp faces defined by positions of the (possibly converted and/or refined) first point pair may be determined. In some embodiments, the clamp points may correspond to a clamp angle that deviates from the ROI direction, but does so within the angle tolerance. Thus, a clamp angle may be determined that corresponds to the first point pair, and the determined distance between the first point pair may be along a direction specified by the clamp angle, as discussed in more detail below.

In other words, a distance between the (possibly converted and/or refined) first point pair may be determined along a direction specified by the clamp angle. This distance may be referred to as the clamp distance. As noted above, in some embodiments, this distance may refer to that between opposite faces/surfaces of the clamp corresponding to the point pair (within specified angle tolerances), as opposed to the actual point to point distance. In other words, the shortest distance between clamp faces may be less than the distance between the two points.

In 620, calibration may be applied. For example, in one embodiment, the above determining a distance between the first point pair along a direction specified by the clamp angle generates a pixel-space distance. In some embodiments, the method may include converting the first point pair from pixel-space to real-world space, thereby generating a real-world point pair, then determining a distance between the real-world point pair along the direction specified by the clamp angle, thereby generating a real-world distance.

In 622, any or all results of the above process may be stored or output, e.g., to a display or storage device. Thus, for example, in one embodiment, the first point pair, the distance, and the clamp angle may be stored, where the first point pair, the distance, and the clamp angle, are useable to analyze the one or more objects As another example, in embodiments where calibration is applied, (one or more of) the first point pair, the pixel-space distance, the real-world point pair, the real-world distance, and the clamp angle may be stored. The first point pair, the pixel-space distance, the real-world point pair, the real-world distance, and/or the clamp angle may be used to analyze or otherwise characterize the object(s) in the image.

As noted above, in some embodiments, a GUI for the tool may be displayed, and user input configuring at least one parameter for the tool may be received, e.g., angle tolerance, region of interest, etc. In response to this configuring, one or more of the above-described method elements may be performed in accordance with the at least one parameter. For example, one or more of the above detecting, determining a convex hull, determining one or more antipodal point pairs, selecting, determining a distance, or storing, may be performed in accordance with the at least one parameter. Of course, in further embodiments, any other actions or aspects of the tool may be configured or specified by appropriate parameters, e.g., as specified by a user via the GUI, retrieved from a configuration file, etc., as desired.

Thus, embodiments of the above method may operate to accurately measure a distance in an image based on machine vision techniques.

FIGS. 7-10—Exemplary Features

FIGS. 7-10 illustrate various exemplary features of the tool and techniques described above. It should be noted, however, that the features discussed are meant to be exemplary only, and are not intended to limit the features contemplated to any particular set. Nor are all of the features described below required, i.e., any of the features described may be omitted or modified as desired. As noted above, one or more of these tool features (among others) may be specified or configured, e.g., via user input to the GUI and/or via a configuration file.

In each of the exemplary cases of FIGS. 7-10, the object being measured is in the center of each image; the search region, also referred to as the region of interest (ROI), is indicated by a rectangular box around or overlapping the object; and the measurement endpoints, which may be referred to as clamp ends, are indicated by respective arrows and extension lines.

Figure 7:
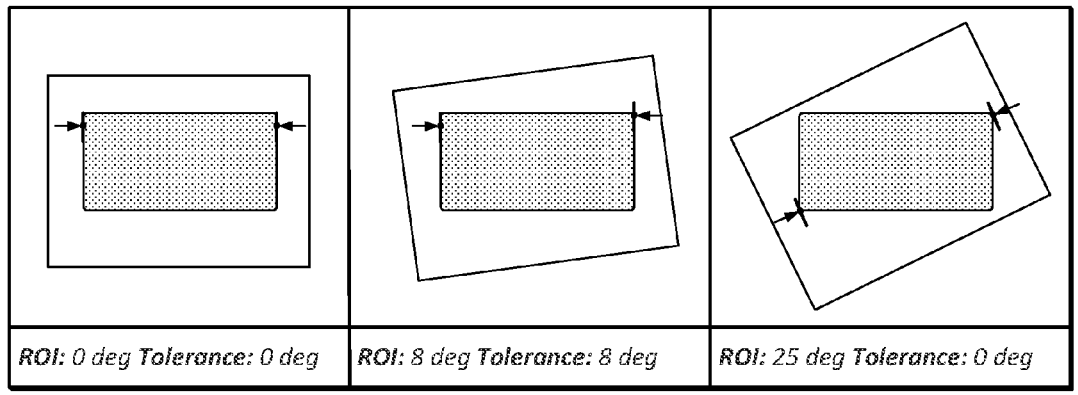
FIG. 7 illustrates orientation of the tool with respect to the direction of a rectangular search region, according to one embodiment.

FIG. 7—Orientation of Tool with Respect to Direction of Search Region

FIG. 7 illustrates orientation of the tool with respect to the direction of a rectangular search region (i.e., the ROI), according to one embodiment. The orientation of the clamp is governed by the direction of the rectangular search region and an angle tolerance, e.g., as specified by the user. A valid clamp direction should be within the specified angle tolerance of the search region direction. The images of FIG. 7 demonstrate this property.

In the left image of FIG. 7, the ROI is specified as 0 degrees, with an angular tolerance of 0 degrees. Thus, the clamp direction is constrained to match the search region direction precisely.

Figure 8:
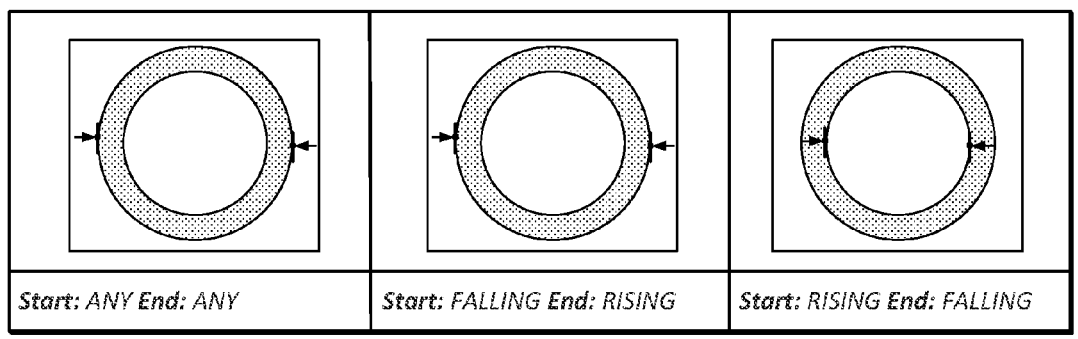
FIG. 8 illustrates examples of edge polarity, according to one embodiment.

FIG. 8—Edge Polarity

FIG. 8 illustrates examples of edge polarity, according to one embodiment. As may be seen, in the left image, the start and end curve/edge polarities are specified as ANY/ANY, and thus may be rising or falling. The maximum distance (for this pair of curves) occurs when the actual polarities are FALLING/RISING, and so, as shown, the start and end curves with the maximum distance (with these polarities) are those on the extreme left and right of the object.

In the case of the middle image of FIG. 8, the polarities are actually specified as FALLING/RISING, and so the same pair of curves (and points) results. Conversely, in the rightmost image of FIG. 8, the polarities are specified as RISING/FALLING, and so, given the ROI direction and polarity constraints, the inner concentric curve and corresponding points are selected.

Figure 9:
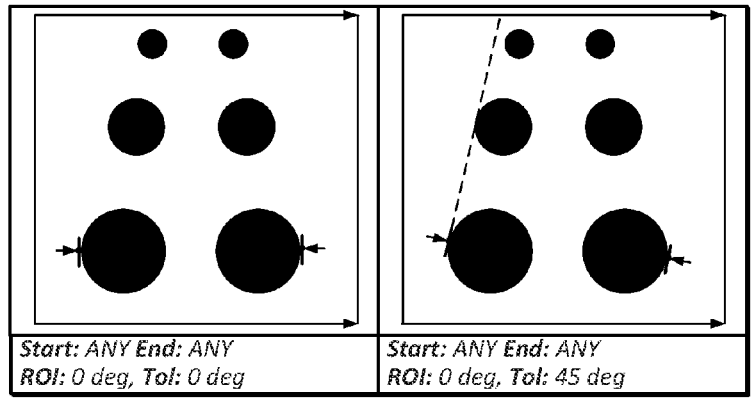
FIG. 9 illustrates clamping of multiple objects, according to one embodiment.

FIG. 9—Clamping of Multiple Objects

In some embodiments, the tool (or method) may provide the ability to handle multiple objects. FIG. 11 illustrates an exemplary case where clamping is performed with respect to multiple objects, specifically, an arrangement of 6 disks. As shown, in the left image, the clamping is specified as ANY/ANY, with an ROI of zero degrees, and a tolerance of zero degrees, resulting in the start and end points shown (on either side of the bottom two objects). As indicated in the right image, when the tolerance is increased to 45 degrees, the method intelligently determines that other objects can constrain the arms of the clamp. Note that in some embodiments, the actual angle will never cross the value as limited by the dashed line (approximately at −11.5 degrees). In one embodiment, this is achieved by maintaining all the valid start and end candidate curves, and not just choosing one pair. The single pair strategy may only work for single objects and few other configurations.

Figure 10:
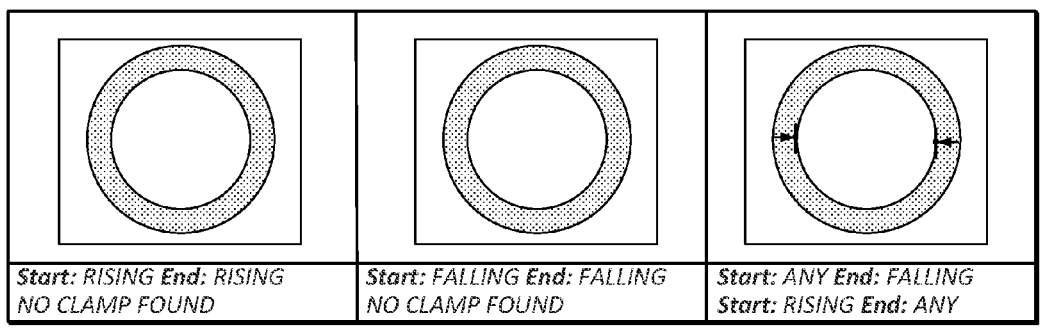
FIG. 10 illustrates rejection (by the tool) of settings that do not generate valid object configurations using a specified pair of edge polarities, according to one embodiment.

FIG. 10—Rejection of Invalid Polarities

FIG. 10 illustrates rejection (by the tool) of settings (i.e., tool configurations) that do not generate valid object configurations using a specified pair of edge polarities, according to one embodiment. The term "object configuration" refers to the arrangement, shape and polarity of the curves comprising the object or objects for the given image and ROI. Note that the validity of a pair of start and end curves depends on their positional relationship with each other. This is especially true of concentric configurations as shown in FIG. 9, where, as may be seen, in the cases of the left and middle images where the respective polarities are specified as RISING/RISING, and FALLING/FALLING, no clamp (curves/points satisfying the criteria) is found. Note that in these cases, there are easily identifiable concentric objects (within the ROI), and so the method may not allow one clamp arm (surface) on the outer surface and the other on the inner one. However, clamps at just the inner circle (RISING/FALLING) or the outer circle (FALLING/RISING) are allowed. This kind of behavior may be implemented to handle most commonly occurring user (e.g., customer) scenarios. In contrast, in the case of the right-most image, with specified polarities ANY/FALLING or RISING/ANY, clamping is possible. Moreover, as explained below with reference to FIG. 10, in cases where the ROI "cuts through" the object, the concentric aspects of the object may not be apparent (within the context of the ROI), and so, rather than two concentric curves, the method or technique may identify 4 curves, which, considered in isolation (i.e., as defined or partitioned by the ROI boundaries), may admit clamping for RISING/RISING or FALLING/FALLING polarities.

FIG. 11—Rejection of Invalid Physical Configurations

The positioning of the search ROI may have a great impact on the results of the clamp. For example, when ROI's cut through objects they often change the relationship between object contours. Thus, some configurations may be "unclampable", and the tool may recognize this and behave accordingly. FIG. 10 illustrates the impact of positioning of the search region of interest (ROI) on the clamping process, according to one embodiment. As FIG. 11 shows, given the metaphor of a physical clamp closing in on the object, one can easily see that in the cases of the left and middle images, clamping is possible under the specified polarities. In contrast, in the right-most image, the conditions for clamping are not satisfied. Note, for example, that the ROI prevents the clamping process from considering proper start/end curves. Following the metaphor of a physical clamp "closing in" on the object, the clamp cannot gain purchase on the curves to define points with maximum distance between them. Embodiments of the tool may apply significant logic to ensure that only physically realizable situations are valid, e.g., via physical modeling of the clamp and (at least a portion of the) object. In other words, the tool may reject a configuration of the tool that does not correspond to a valid physical configuration.

Thus, in some embodiments, the tool/method may be configured to detect (and reject) configurations (e.g., with specified constraints) that are "unclampable" for any reasons, and may indicate that this is so, i.e., may output an indication that the configuration is invalid, e.g., by reporting an error.

Thus, various embodiments of the above systems and methods may be used to accurately measure objects in or aspects of images via machine vision.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer accessible memory medium that stores program instructions implementing a clamping tool, wherein the program instructions are executable by a processor to:

receive an image, wherein the image includes curves corresponding to one or more objects in the image;

detect a plurality of curves in a specified region of interest (ROI) in the image, wherein the ROI has a specified direction, and wherein each curve comprises respective curve points;

determine a convex hull based on the respective curve points;

determine one or more candidate antipodal point pairs of the convex hull;

select a first point pair of the one or more antipodal point pairs based on one or more specified constraints;

determine a clamp angle corresponding to the first point pair;

determine a distance between the first point pair along a direction specified by the clamp angle; and store the first point pair, the distance, and the clamp angle, wherein the first point pair, the distance, and the clamp angle, are useable to analyze the one or more objects.

2. The non-transitory computer accessible memory medium of claim 1, wherein the program instructions are further executable by a processor to:

analyze and validate the plurality of curves, thereby determining a plurality of validated curves, wherein said determining the convex hull comprises determining the convex hull based on respective curve points of the plurality of validated curves.

3. The non-transitory computer accessible memory medium of claim 1, wherein the program instructions are further executable by a processor to:

perform subpixel accurate refinement of positions of the first point pair, thereby determining a refined first point pair, wherein said determining a distance between the first point pair comprises determining a distance between the refined first point pair.

4. The non-transitory computer accessible memory medium of claim 1, wherein the program instructions are further executable by a processor to:

display a graphical user interface (GUI) for the tool;

receive user input configuring at least one parameter for the tool;

wherein said detecting, said determining a convex hull, said determining one or more candidate antipodal point pairs, said selecting, said determining a clamp angle, said determining a distance, or said storing are performed in accordance with the at least one parameter.

5. The non-transitory computer accessible memory medium of claim 4, wherein the at least one parameter comprises one or more of:

angle tolerance;

the ROI;

orientation of the tool with respect to search direction for the ROI;

one or more edge polarities; or one or more constraints.

6. The non-transitory computer accessible memory medium of claim 5, wherein the program instructions are further executable by a processor to:

reject a tool configuration that does not generate a valid object configuration using a specified pair of edge polarities.

7. The non-transitory computer accessible memory medium of claim 1, wherein the program instructions are further executable by a processor to:
reject a tool configuration that does not correspond to a valid physical configuration.

8. The non-transitory computer accessible memory medium of claim 7, wherein to reject a tool configuration that does not correspond to a valid physical configuration the program instructions are further executable by a processor to:
perform physical modeling of the tool and at least a portion of the one or more objects.

9. The non-transitory computer accessible memory medium of claim 1, wherein the program instructions are further executable by a processor to:
detect a configuration that is unclampable; and
output an indication that the configuration is invalid.

10. A computer-implemented method, comprising:
utilizing a computer to perform:
receiving an image, wherein the image includes curves corresponding to one or more objects in the image;
detecting a plurality of curves in a specified region of interest (ROI) in the image, wherein the ROI has a specified direction, wherein each curve comprises respective curve points;
determining a convex hull based on the respective curve points;
determining one or more candidate antipodal point pairs of the convex hull;
selecting a first point pair of the one or more antipodal point pairs based on one or more specified constraints;
determining a clamp angle corresponding to the first point pair;
determining a distance between the first point pair along a direction specified by the clamp angle; and
storing the first point pair, the distance, and the clamp angle, wherein the first point pair, the distance, and the clamp angle, are useable to analyze the one or more objects.

11. A system, comprising:
a processor;
a memory, coupled to the processor, wherein the memory stores program instructions executable by the processor to:
receive an image, wherein the image includes curves corresponding to one or more objects in the image;
detect a plurality of curves in a specified region of interest (ROI) in the image, wherein the ROI has a specified direction, wherein each curve comprises respective curve points;
determine a convex hull based on the respective curve points;
determine one or more candidate antipodal point pairs of the convex hull;
select a first point pair of the one or more antipodal point pairs based on one or more specified constraints;
determine a clamp angle corresponding to the first point pair;
determine a distance between the first point pair along a direction specified by the clamp angle; and
store the first point pair, the distance, and the clamp angle, wherein the first point pair, the distance, and the clamp angle, are useable to analyze the one or more objects.

12. The system of claim 11, wherein the program instructions are further executable by a processor to:
perform subpixel accurate refinement of positions of the first point pair, thereby determining a refined first point pair, wherein said determining a distance between the first point pair comprises determining a distance between the refined first point pair.

13. The system of claim 11, wherein the program instructions are further executable by a processor to:
display a graphical user interface (GUI) for the tool;
receive user input configuring at least one parameter for the tool;
wherein said detecting, said determining a convex hull, said determining one or more candidate antipodal point pairs, said selecting, said determining a clamp angle, said determining a distance, or said storing are performed in accordance with the at least one parameter.

14. The system of claim 13, wherein the at least one parameter comprises one or more of:
angle tolerance;
the ROI;
orientation of the tool with respect to search direction for the ROI;
one or more edge polarities; or
one or more constraints.

15. The system of claim 11, wherein the program instructions are further executable by a processor to:
detect a configuration that is unclampable; and
output an indication that the configuration is invalid.

16. A system, comprising:
a functional unit; and
a memory, coupled to the functional unit;
wherein the functional unit is configured to:
receive an image, wherein the image includes curves corresponding to one or more objects in the image;
detect a plurality of curves in a specified region of interest (ROI) in the image, wherein the ROI has a specified direction, wherein each curve comprises respective curve points;
determine a convex hull based on the respective curve points;
determine one or more candidate antipodal point pairs of the convex hull;
select a first point pair of the one or more antipodal point pairs based on one or more specified constraints;
determine a clamp angle corresponding to the first point pair;
determine a distance between the first point pair along a direction specified by the clamp angle; and
store the first point pair, the distance, and the clamp angle, wherein the first point pair, the distance, and the clamp angle, are useable to analyze the one or more objects.

17. The system of claim 16, wherein the functional unit comprises a programmable hardware element.

18. The system of claim 16, wherein the functional unit and memory are comprised in a smart camera.

19. The system of claim 16, wherein the program instructions are further executable by a processor to:
perform subpixel accurate refinement of positions of the first point pair, thereby determining a refined first point pair, wherein said determining a distance between the first point pair comprises determining a distance between the refined first point pair.

20. The system of claim 16, wherein the functional unit is further configured to:
receive user input configuring at least one parameter for the tool;
wherein said detecting, said determining a convex hull, said determining one or more candidate antipodal point pairs, said selecting, said determining a clamp angle, said determining a distance, or said storing are performed in accordance with the at least one parameter.

21. The system of claim 20, wherein the at least one parameter comprises one or more of:
    angle tolerance;
    the ROI;
    orientation of the tool with respect to search direction for the ROI;
    one or more edge polarities; or
    one or more constraints.

22. The system of claim 16, wherein the functional unit is further configured to:
    detect a configuration that is unclampable; and
    output an indication that the configuration is invalid.

23. A non-transitory computer accessible memory medium that stores program instructions implementing a clamping tool, wherein the program instructions are executable by a processor to:
    receive an image, wherein the image includes curves corresponding to one or more objects in the image;
    detect a plurality of curves in a specified region of interest (ROI) in the image, wherein the ROI has a specified direction, wherein each curve comprises respective curve points in pixel-space;
    correct the curve points in pixel-space of each of the plurality of curves using calibration information, thereby generating a corresponding plurality of corrected curve points in corrected pixel-space;
    determine a convex hull of the plurality of corrected curve points;
    determine one or more candidate antipodal point pairs of the convex hull;
    convert the one or more candidate antipodal point pairs from corrected pixel-space to pixel-space, thereby generating one or more converted candidate antipodal point pairs;
    select a first point pair of the one or more converted candidate antipodal point pairs based on one or more specified constraints;
    determine a clamp angle corresponding to the first point pair;
    determine a distance between the first point pair along a direction specified by the clamp angle, thereby generating a pixel-space distance;
    convert the first point pair from pixel-space to real-world space, thereby generating a real-world point pair;
    determine a distance between the real-world point pair along the direction specified by the clamp angle, thereby generating a real-world distance; and
    store the first point pair, the pixel-space distance, the real-world point pair, the real-world distance, and the clamp angle, wherein first point pair, the pixel-space distance, the real-world point pair, the real-world distance, and the clamp angle are useable to analyze the one or more objects.

24. A system, comprising:
    a functional unit; and
    a memory, coupled to the functional unit;
    wherein the functional unit is configured to:
        receive an image, wherein the image includes curves corresponding to one or more objects in the image;
        detect a plurality of curves in a specified region of interest (ROI) in the image, wherein the ROI has a specified direction, wherein each curve comprises respective curve points in pixel-space;
        correct the curve points in pixel-space of each of the plurality of curves using calibration information, thereby generating a corresponding plurality of corrected curve points in corrected pixel-space;
        determine a convex hull of the plurality of corrected curve points;
        determine one or more candidate antipodal point pairs of the convex hull;
        convert the one or more candidate antipodal point pairs from corrected pixel-space to pixel-space, thereby generating one or more converted candidate antipodal point pairs;
        select a first point pair of the one or more converted candidate antipodal point pairs based on one or more specified constraints;
        determine a clamp angle corresponding to the first point pair;
    determine a distance between the first point pair along a direction specified by the clamp angle, thereby generating a pixel-space distance;
    convert the first point pair from pixel-space to real-world space, thereby generating a real-world point pair;
    determine a distance between the real-world point pair along the direction specified by the clamp angle, thereby generating a real-world distance; and
    store the first point pair, the pixel-space distance, the real-world point pair, the real-world distance, and the clamp angle, wherein first point pair, the pixel-space distance, the real-world point pair, the real-world distance, and the clamp angle are useable to analyze the one or more objects.

* * * * *

UNITED STATES PATENT AND TRADEMARK OFFICE
CERTIFICATE OF CORRECTION

| | | |
|---|---|---|
| PATENT NO. | : 8,879,848 B2 | Page 1 of 1 |
| APPLICATION NO. | : 13/559767 | |
| DATED | : November 4, 2014 | |
| INVENTOR(S) | : Bagaria et al. | |

It is certified that error appears in the above-identified patent and that said Letters Patent is hereby corrected as shown below:

Title page:

(74) *Attorney, Agent, or Firm*:
please delete "Meyerstons" and substitute -- Meyertons --.

Signed and Sealed this
Seventeenth Day of February, 2015

Michelle K. Lee
*Deputy Director of the United States Patent and Trademark Office*